(12) United States Patent
Lauster

(10) Patent No.: US 10,382,931 B2
(45) Date of Patent: Aug. 13, 2019

(54) METHOD FOR IMPROVED HANDLING OF EMERGENCY CALLS IN A ROAMING SCENARIO, TELECOMMUNICATIONS NETWORK, PROGRAM AND COMPUTER PROGRAM PRODUCT

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/555,514

(22) PCT Filed: Mar. 23, 2016

(86) PCT No.: PCT/EP2016/056342
§ 371 (c)(1),
(2) Date: Sep. 4, 2017

(87) PCT Pub. No.: WO2016/150998
PCT Pub. Date: Sep. 29, 2016

(65) Prior Publication Data
US 2018/0049010 A1    Feb. 15, 2018

(30) Foreign Application Priority Data
Mar. 26, 2015    (EP) .................................... 15161141

(51) Int. Cl.
*H04L 12/66*    (2006.01)
*H04W 4/90*    (2018.01)
(Continued)

(52) U.S. Cl.
CPC .......... *H04W 4/90* (2018.02); *H04L 12/4633* (2013.01); *H04L 65/105* (2013.01); *H04W 8/02* (2013.01);
(Continued)

(58) Field of Classification Search
CPC ......... H04W 4/24; H04W 8/02; H04W 76/50; H04W 76/32; H04W 76/22; H04W 80/06;
(Continued)

(56) References Cited

U.S. PATENT DOCUMENTS 8,040,862 B1 * 10/2011 Rosenberg ........... G06Q 20/102
370/338
8,280,342 B1 * 10/2012 Manning ................ H04M 11/04
455/404.1
(Continued)

FOREIGN PATENT DOCUMENTS

| EP | 2833656 A2 | 2/2015 |
| WO | WO 2013160465 A2 | 10/2013 |
| WO | WO 2014114777 A2 | 7/2014 |

OTHER PUBLICATIONS

"3$^{rd}$ Generation Partnership Project; Technical Specification Group Services and System Aspects; IP Multimedia Subsystem (IMS) emergency sessions (Release 12)", 3GPP Draft; 23167-C10, 3rd Generation Partnership Project (3GPP), Mobile Competence Centre; 650, Route Des Lucioles; F-06921 Sophia-Antipolis Cedex; France, Mar. 24, 2015 (Mar. 24, 2015), XP050961162.
(Continued)

*Primary Examiner* — Gary Lafontant
(74) *Attorney, Agent, or Firm* — Leydig, Voit & Mayer, LTD.

(57) ABSTRACT

A method for handling of emergency calls in a roaming scenario includes: initiating, by a user equipment, a voice call using a specific emergency call telephone number, wherein the specific emergency call telephone number is a valid emergency call telephone number in a visited telecommunications network, and wherein the voice call is initiated via transmitting a first message comprising the specific emergency call telephone number to a second network node of a home telecommunications network; initially handling,
(Continued)

by the user equipment, the voice call as a normal voice call; detecting the specific emergency call telephone number as being a valid emergency call telephone number within the visited telecommunications network in relation to the voice call; and generating, by the home telecommunications network, a second message, the second message being transmitted to the user equipment, the second message comprising an indication, to the user equipment, to trigger an emergency call procedure.

11 Claims, 1 Drawing Sheet

(51) Int. Cl.
*H04W 76/50* (2018.01)
*H04W 76/12* (2018.01)
*H04L 12/46* (2006.01)
*H04L 29/06* (2006.01)
*H04W 8/02* (2009.01)
*H04W 36/14* (2009.01)
*H04W 48/18* (2009.01)
*H04W 92/02* (2009.01)

(52) U.S. Cl.
CPC ........... *H04W 76/12* (2018.02); *H04W 76/50* (2018.02); *H04L 65/1016* (2013.01); *H04W 36/14* (2013.01); *H04W 48/18* (2013.01); *H04W 92/02* (2013.01)

(58) Field of Classification Search
CPC ... H04W 8/08; H04M 15/39; H04M 1/72536; H04M 2242/04; H04M 3/5116
See application file for complete search history.

(56) References Cited

U.S. PATENT DOCUMENTS

2010/0014508 A1* 1/2010 Yang ................... H04M 7/0057
370/352
2010/0048161 A1* 2/2010 He .......................... H04W 4/90
455/404.1

OTHER PUBLICATIONS

"$3^{rd}$ Generation Partnership Project; Technical Specification Group Services and System Aspects; Internet Protocol (IP) based IP Multimedia Subsystem (IMS) emergency sessions (Release 7)", 3GPP Draft; 23867-710, 3rd Generation Partnership Project (3GPP), Mobile Competence Centre; 650, Route Des Lucioles; F-06921 Sophia-Antipolis Cedex; France, Dec. 6, 2005 (Dec. 6, 2005), XP050909830.

Huawei Technologies: Roaming case for IMS emergency session§, 3GPP Draft; S2-032034, $3^{rd}$ Generation Partnership Project (3GPP), Mobile Competence Centre; 650, Route Des Lucioles; F-06921 Sophia-Antipolis Cedex; France, vol. SA WG2, No. San Diego, USA; May 7, 2003, May 7, 2003 (May 7, 2003), XP050244605.

Qualcomm Europe: "Support of Local Emergency Numbers (updated)", 3GPP Draft; S2-062620 (Support of Local Emergency Numbers), $3^{rd}$ Generation Partnership Project (3GPP), Mobile Competence Centre; 650, Route Des Lucioles; F-06921 Sophia-Antipolis Cedex; France, vol. SA WG2, No. Sophia; Sep. 1, 2006, Aug. 3, 2006 (Aug. 3, 2006), XP050432306.

* cited by examiner

METHOD FOR IMPROVED HANDLING OF EMERGENCY CALLS IN A ROAMING SCENARIO, TELECOMMUNICATIONS NETWORK, PROGRAM AND COMPUTER PROGRAM PRODUCT

CROSS-REFERENCE TO RELATED APPLICATIONS

This application is a U.S. National Phase application under 35 U.S.C. § 371 of International Application No. PCT/EP2016/056342, filed on Mar. 23, 2016, and claims benefit to European Patent Application No. EP 15161141.5, filed on Mar. 26, 2015. The International Application was published in English on Sep. 29, 2016 as WO 2016/150998 A1 under PCT Article 21(2).

FIELD

The present invention relates to a method for improved handling of emergency calls in a roaming scenario, wherein a user equipment (UE) is assigned to a home telecommunications network, and connected to a visited telecommunications network, wherein a first network node of the visited telecommunications network communicates with a second network node of the home telecommunications network via an IP transportation tunnel, wherein an appropriate handling is provided in case that both a voice call is initiated by the user equipment using a specific emergency call telephone number being a valid emergency call telephone number in the visited telecommunications network, and the user equipment initially handling the voice call—involving the specific emergency call telephone number—as a normal voice call (non-UE detected emergency call).

Furthermore, the present invention relates to a telecommunications network and to a system for improved handling of emergency calls in a roaming scenario, wherein a user equipment is assigned to a home telecommunications network, and connected to a visited telecommunications network, wherein the system comprises the home telecommunications network and the visited telecommunications network, wherein a first network node of the visited telecommunications network communicates with a second network node of the home telecommunications network via an IP transportation tunnel, wherein an appropriate handling is provided in case that both a voice call is initiated by the user equipment using a specific emergency call telephone number being a valid emergency call telephone number in the visited telecommunications network, and the user equipment initially handling the voice call—involving the specific emergency call telephone number—as a normal voice call (non-UE detected emergency call).

Additionally, the present invention relates to a program and to a computer program product for improved handling of emergency calls in a roaming scenario.

The present invention relates to the area of both wireless and nomadic or fixed communications.

BACKGROUND

To support large numbers of (roaming) subscribers—e.g. mobile subscribers or nomadic, i.e. temporarily fixed subscribers—a number of telecommunications networks such as public land mobile networks and/or stationary (fixed line) networks have been established and are operative. Telecommunications networks such as public land mobile networks (PLMNs) may communicatively connect to other mobile telecommunications networks and/or to fixed, land-wired public switched telephone networks (PSTNs) and/or to data networks such as the internet (or IP-networks, internet protocol networks). User equipments (e.g. a mobile or nomadic terminal) are typically assigned to a home telecommunications network, such as a home public land mobile network. In a roaming scenario, the user equipment is typically not located in reach of the home telecommunications network (or home public land mobile network) but is connected to a visited telecommunications network (or visited public land mobile network). Most modern telecommunications networks (such as public land mobile networks or also data networks) are packet-switched networks, in which data are routed in autonomous units called data packets. Packet-switched networks are characterized by high speed, low latency, and high network resource utilization efficiency. Two examples of packet-switched technologies are the General Packet Radio Service (GPRS) of the Global System for Mobile communications (GSM), and the Evolved Packet System (EPS), also commercially known as the Long Term Evolution (LTE), of the Universal Mobile Telecommunications System (UMTS), wireless local area network (WLAN). The Internet Protocol (IP) is a widely-deployed protocol for data communications in packet-switched networks. The IP Multimedia System (IMS) is an industry standard framework for delivering voice and multimedia communications over IP networks. Communications between nodes within an IMS network utilize the Session Initiation Protocol (SIP). SIP is a signaling protocol for Internet conferencing, telephony, presence, events notification, instant messaging, and the like. SIP signaling uses a long-term stable identifier, the SIP Universal Resource Indicator (URI). SIP signaling data packets in an IMS network are processed by network node of the telecommunications network, usually also called SIP servers or proxies. Together, these network nodes provide a call session control function (CSCF). Different types of such CSCF network nodes perform specific functions: A proxy call session control function (P-CSCF) is a SIP proxy that is the first point of contact for a user equipment (or an IMS terminal). Typically, the proxy call session control function that a user equipment uses is located in the visited telecommunications network in case that local breakout is used. In case local breakout is not used, the proxy call session control function a user equipment normally uses is located in the home telecommunications network (i.e. the proxy call session control function is part of or is assigned to the home telecommunications network).

Also IMS enabled user equipments need to be able to place emergency calls even when located in (and connected to) a visited telecommunications network. Non-UE-detected emergency calls (i.e. emergency calls that are placed (or initiated) by the user equipment which are emergency calls in the network environment of the user equipment (i.e. in the visited telecommunications network) that the user equipment is unaware of, e.g. due to the use of an emergency call telephone number (valid in the visited telecommunications network) that is not maintained in a list within the user equipment) are relatively easy to handle in case of using local breakout: In this case, the local proxy call session control function (i.e. the proxy call session control function of the visited telecommunications network) has a list of the local emergency numbers (of the visited telecommunications network or valid within the respective context of the user equipment in the visited telecommunications network), and is hence able to detect the call type (i.e. the emergency type of an emergency call) and apply the needed procedures to guarantee successful handling of the requested emergency service.

In scenarios where no local breakout is to be used, and each call is routed to (a respective proxy call session control function within) the home telecommunications network, there is only the possibility to maintain a (normally huge) list of local emergency numbers (that are applicable or valid within the different telecommunications networks of all the possible roaming partners of the home telecommunications network) with a mapping to the related uniform resource names of the emergency call telephone numbers (also called sos-uniform resource names) in the local network node or the home telecommunications network (typically a proxy call session control function of the home telecommunications network). The maintenance of such a database for all roaming partners worldwide requires a considerable effort and—hence—is very costly.

SUMMARY

In an exemplary embodiment, the present invention provides a method for handling of emergency calls in a roaming scenario. A user equipment is assigned to a home telecommunications network, and the user equipment is connected to a visited telecommunications network. A first network node of the visited telecommunications network communicates with a second network node of the home telecommunications network via an IP transportation tunnel. Upon an establishment step of the IP transportation tunnel and/or upon a modification step of the IP transportation tunnel an emergency service information is transmitted to the second network node of the home telecommunications network. The method includes: initiating, by the user equipment, a voice call using a specific emergency call telephone number, wherein the specific emergency call telephone number is a valid emergency call telephone number in the visited telecommunications network, and wherein the voice call is initiated via transmitting a first message comprising the specific emergency call telephone number to the second network node of the home telecommunications network; initially handling, by the user equipment, the voice call—involving the specific emergency call telephone number—as a normal voice call; detecting—based on the emergency service information transmitted to the second network node of the home telecommunications network—by the home telecommunications network, the specific emergency call telephone number as being a valid emergency call telephone number within the visited telecommunications network in relation to the voice call; and generating, by the home telecommunications network, a second message, the second message being transmitted to the user equipment, the second message comprising an indication, to the user equipment, to trigger an emergency call procedure in accordance with the configuration of the visited telecommunications network via a third message.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
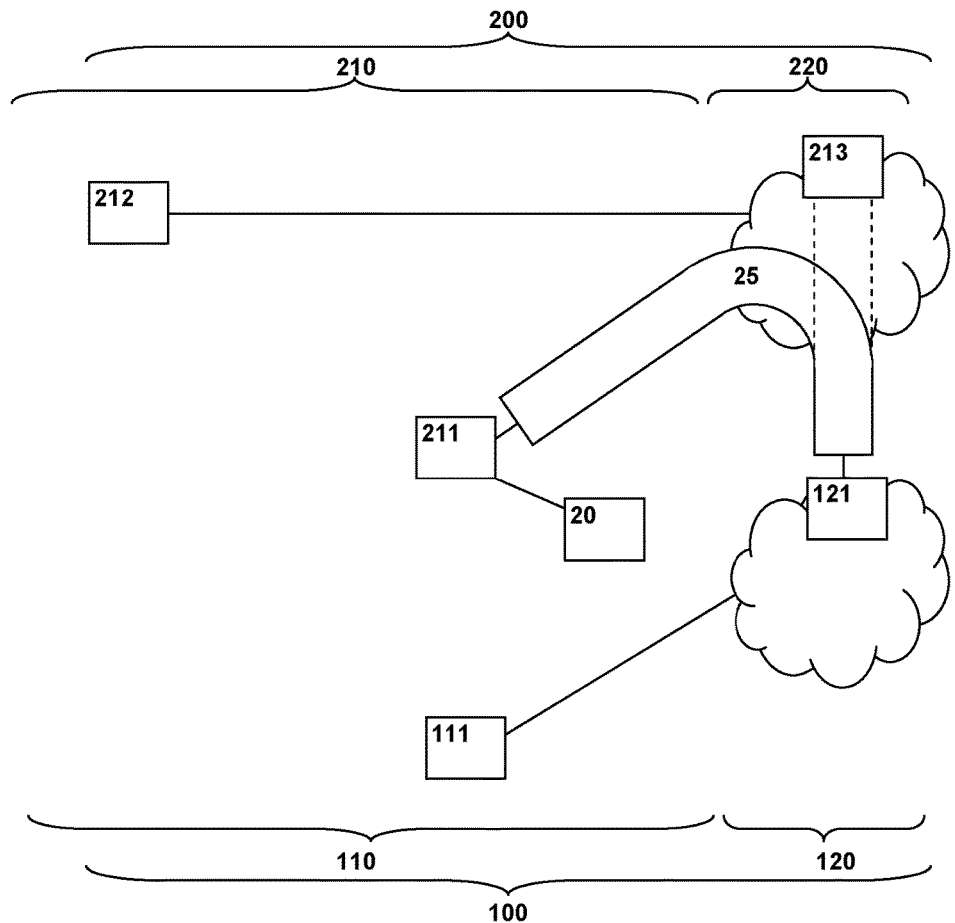
FIG. 1 schematically illustrates a system according to the present invention, comprising a first telecommunications network (or home telecommunications network) and a second telecommunications network (or visited telecommunications network), and a user equipment connected to the visited telecommunications network.

Exemplary embodiments of the present invention provide an effective and simple solution (especially reducing operational costs (OPEX costs)) to exchange local emergency call information (i.e. the emergency call telephone numbers applicable in the possible visited telecommunications networks, i.e. roaming partners of the (home) telecommunications network) such that any local emergency calls in roaming situations (without local breakout) can be treated correctly by the home telecommunications network with a drastically reduced effort to maintain a database or a list of emergency call number information of numerous potential visited telecommunications networks, and without the need to rely on user equipment implementation, e.g. in an approach to provide (emergency call) numbers (of the local visited telecommunications network) to the user equipment.

In an exemplary embodiment, the present invention provides a method for improved handling of emergency calls in a roaming scenario, wherein a user equipment is assigned to a home telecommunications network, and wherein the user equipment is connected to a visited telecommunications network, wherein a first network node of the visited telecommunications network communicates with a second network node of the home telecommunications network via an IP transportation tunnel,
wherein upon an establishment step of the IP transportation tunnel and/or upon a modification step of the IP transportation tunnel an emergency service information is transmitted to the second network node of the home telecommunications network, wherein in case that both
    a voice call is initiated by the user equipment using a specific emergency call telephone number being a valid emergency call telephone number in the visited telecommunications network, and
    the user equipment initially handling the voice call—involving the specific emergency call telephone number—as a normal voice call (non-UE detected emergency call), the method comprises the steps of:
    in a first step, the voice call is initiated by the user equipment via transmitting a first message to the (second network node of the) home telecommunications network, the first message comprising the specific emergency call telephone number,
    in a second step, subsequent to the first step, the specific emergency call telephone number is detected—based on the emergency service information transmitted to the (second network node of the) home telecommunications network—by the home telecommunications network, as being a valid emergency call telephone number within the visited telecommunications network in relation of the voice call, in a third step, subsequent to the second step, a second message is generated by the home telecommunications network, the second message being transmitted to the user equipment, the second message comprising an indication, to the user equipment, to trigger an emergency call procedure in accordance to the configuration of the visited telecommunications network via a third message.

It is thereby advantageously possible according to the present invention to identify local emergency calls in roaming scenarios without the need to rely on user equipment implementation when providing numbers to the user equipment, and drastically reducing the efforts to maintain—within the home telecommunications network—a list of local emergency numbers of all roaming partners that is always up to date. According to the present invention, it is hence advantageously possible that network operators are enabled to deploy a simple, cost efficient, and network-based method with minor provisioning effort to handle non-user equipment detected emergency calls when roaming without local breakout. The transport of the emergency service information can be done dynamically at bearer establishment by reusing well defined IP tunnel transport towards the home telecommunications network without an impact on potentially encrypted SIP signaling, i.e. separated from SIP signaling.

National regulation defines emergency services by the local numbering plan. If an emergency number (i.e. an emergency call telephone number) is not provisioned to a user equipment (or a terminal equipment such as an IMS UE or generic SIP UE, etc) and the user dials such an unknown emergency number (i.e. a telephone number for which the user equipment is not aware that it is an emergency number), the user equipment will initiate the call setup as a normal call using the dialed telephone number. Therefore, it needs to be assured to detect that the initiated call is dedicated to an emergency service, identify the service and proceed with the correct procedures related to this service, such as, e.g., assigning an sos-URN (uniform resource name of the sos top level domain, especially as defined according to the 3GPP (Third Generation Partnership Project) and/or IETF (Internet Engineering Task Force standard)) to guarantee the routing to the respective responsible public safety answering point (PSAP).

According to the present invention, an improved handling of emergency calls in a roaming scenario is possible in cases where the proxy functionality of the home telecommunications network is used in the roaming scenario, i.e. in cases without local breakout. It is therefore advantageously possible according to the present invention that the visited telecommunications network (more specifically the enhanced packet system of the visited telecommunications network) is responsible to provide the necessary emergency service information pending the local emergency regulation (e.g. regarding the local numbering plan).

According to the present invention, an IP transportation tunnel is established between (at least) a first network node of the visited telecommunications network and a second network node of the home telecommunications network. The IP transportation tunnel is especially realized via a GTP tunnel, the term "GTP tunnel" referring to a tunnel using the GPRS Tunneling protocol (GTP). The GTP is an IP/UDP-based protocol (Internet Protocol/User Datagram Protocol) used in GSM core networks (i.e. the so-called second generation telecommunications networks, according to the Global System for Mobile Communication standard), UMTS core networks (i.e. the so-called third generation telecommunications network, according to the Universal Mobile Telecommunications System) and LTE core networks (i.e. the so-called fourth generation telecommunications network, according to the Long Term Evolution standard). The GTP is used to encapsulate user data when passing between and/or through network node of the core network, and also carries bearer specific signaling traffic between various network nodes of the core network. The GTP is typically implemented using a GTP-C part as well as a GTP-U part. The GTP-C part is the control part, used for specific signaling (e.g. bearer activation/deletion/modification, etc.) in GPRS, UMTS, and LTE/SAE (System Architecture Evolution)/EPC (Evolved Packet Core) networks. The GTP-U part is used in user plane to carry user data traffic in GPRS, UMTS and LTE networks. Additionally, a GTP' part might be implemented, the GTP' part being used for carrying charging data. According to the present invention, the IP transportation tunnel (or a part thereof, such as the GTP-C part) can also be established—besides between the first network node of the visited telecommunications network and a second network node of the home telecommunications network (where, e.g., the GTP-U part is established)—between an additional network node (such as the responsible mobility management entity) of the visited telecommunications network and the second network node of the home telecommunications network.

The valid emergency call telephone numbers can vary from country to country and also their number and the associated or assigned emergency types of the emergency call telephone numbers. The telephone number used by the user equipment to initiate the voice call is also called the specific emergency call telephone number. The assumption is that the user equipment is not aware of the fact of using a valid emergency call telephone number, i.e. the initiated voice call is a non-user equipment detected emergency call: The user equipment initially handles the voice call—involving the specific emergency call telephone number—as a normal voice call (as at least part of the locally (in the visited telecommunications network) valid emergency call telephone numbers might not be provided or provisioned to the user equipment). According to the present invention, an exemplary embodiment of the inventive method comprises the user equipment initially handling the voice call (using the specific emergency telephone number) like any other voice call.

The present invention refers to a roaming situation of the user equipment, i.e. the user equipment is—while being assigned (or registered as a valid subscriber or assigned to a valid subscription) to its home telecommunications network—connected to the visited telecommunications network, i.e. the user equipment camps on the visited telecommunications network or on the access network of the visited telecommunications network. According to the present invention, the emergency service information (of the visited telecommunications network) is transmitted to the second network node of the home telecommunications network, using the IP transportation tunnel. According to the present invention, the transmission of the emergency service information is related to the (existence or applicability of the) roaming situation of the user equipment in such a manner that upon invocation of the roaming situation, the emergency service information is transmitted using the IP transportation tunnel. As the IP transportation tunnel is established between (at least) a first network node of the visited telecommunications network and a second network node of the home telecommunications network, it is the first network node of the visited telecommunications network that transmits the emergency service information; hence, according to a preferred embodiment of the present invention, the first network node of the visited telecommunications network, or another network node (of the core network) of the visited telecommunications network, transmits the emergency service information to the second network node of the home telecommunications network. There are two main cases or scenarios: According to the first scenario, the user equipment is switched on (or a (first or initial) data connection of the user equipment is established) while being located in the coverage area of the visited telecommunications network; according to the second scenario, the user equipment enters the coverage area of the visited telecommunications network while being connected (during a point in time prior to entering the new coverage area) to the home telecommunications network (or to another visited telecommunications network). According to the present invention, it is assured (i.e. the visited telecommunications network and the home telecommunications network are configured such) that the emergency service information is transmitted to the home telecommunications network in both of the mentioned scenarios; in the first scenario, the IP transportation tunnel is generated upon the user equipment being switched on, whereas in the second scenario, the IP transportation tunnel is rather modified (instead of being completely (newly) generated) at a point in time when the user equipment is handed over (either from the home telecommunications network or from another visited telecommunications network) to the visited telecommunications network.

After the emergency service information being transmitted to the home telecommunications network, the home telecommunications network is aware of the emergency call telephone numbers currently applicable in the visited telecommunications network, and hence, in case that (at a point in time subsequent to the transmission of the emergency service information) both the following two conditions are fulfilled:

a voice call is initiated by the user equipment (while the user equipment still being in the coverage are of the visited telecommunications network) using a specific emergency call telephone number being a valid emergency call telephone number in the visited telecommunications network, and the user equipment initially handling the voice call— involving the specific emergency call telephone number—as a normal voice call (non-UE detected emergency call, i.e. the user equipment is, at least initially not aware of the used telephone number being a valid emergency call telephone number (with respect to the visited telecommunications network)), the home telecommunications network is able to indicate to the user equipment how to behave in order to correctly treat the voice call (using the specific emergency call telephone number, i.e. a valid emergency call telephone number within the visited telecommunications network). Specifically, this is done, according to the present invention, via in a first step, the user equipment initiating the voice call by transmitting a first message to the second network node of the home telecommunications network in a second step, the home telecommunications network—based on the emergency service information— detecting (or recognizing) the specific emergency call telephone number as being a valid emergency call telephone number within the visited telecommunications network (i.e. via the emergency service information, the home telecommunications network becomes aware that the telephone number used by the user equipment corresponds to a valid emergency call telephone number within the visited telecommunications network), and in a third step, transmitting a second message from the home telecommunications network to the user equipment, thereby indicating to the user equipment how to behave (i.e. via the second message, the user equipment becomes aware of having initiated an emergency call by originally initiating the voice call and triggering the first message), i.e. comprising an indication to the user equipment to trigger an emergency call procedure in accordance to the configuration of the visited telecommunications network via a third message (to be sent typically from the user equipment to the visited telecommunications network). According to the present invention, the first message comprises the specific emergency call telephone number such that the home telecommunications network—based on the available emergency service information of the visited telecommunications network—is able to detect or recognize the used (i.e. specific) emergency call telephone number as being a valid emergency call telephone number.

Via transmitting the emergency service information from the visited telecommunications network to the home telecommunications network, it is advantageously possible according to the present invention, that an updated database information regarding the current emergency call telephone numbers applicable in the visited telecommunications network can be provided for (e.g. generated) in the home telecommunications network. Relating to a certain number of (different) visited telecommunications networks, such pieces of emergency service information are transmitted to the home telecommunications network for any user equipment being either switched on in the visited telecommunications network or entering the coverage area of the visited telecommunications network; hence in case such a database is maintained within the home telecommunications network, it is necessarily always automatically kept up to date. The transport of the emergency service information can be done dynamically at bearer establishment by reusing well defined IP tunnel transport towards the home telecommunications network without an impact on potentially encrypted SIP signaling, i.e. separated from SIP signaling.

According to the present invention it is preferred that the normal manner is a non-emergency call manner and/or that the proxy functionality of the home telecommunications network is used in the roaming scenario (no local breakout) and/or that the normal voice call is a non-emergency call manner and/or that a proxy functionality of the home telecommunications network is used in the roaming scenario (no local breakout).

According to a further embodiment of the present invention, the home telecommunications network comprises a home access network and a home core network, and the visited telecommunications network comprises a visited access network and a visited core network, wherein the visited access network of the visited telecommunications network comprises a plurality of access entities, especially base station entities, wherein the user equipment is connected to the visited telecommunications network via one of the access entities, especially base station entities, being the serving access entity, especially the serving base station entity, of the user equipment, wherein the first network node of the visited telecommunications network corresponds to the serving access entity, especially the serving base station entity, of the user equipment and/or to a mobility management entity of the visited telecommunications network, and the second network node of the home telecommunications network corresponds to a serving gateway or to a packet data gateway of the home core network.

Thereby, it is advantageously possible according to the present invention that the IP transportation tunnel is realized between, on the one hand, the serving base station entity of the user equipment and/or to the corresponding mobility management entity of the user equipment in the visited telecommunications network, and, on the other hand, the serving gateway or to the packet data gateway of the home core network. Especially, it is advantageously possible that
  one part of the IP transportation tunnel, e.g. a GTP-C part, is established between the mobility management entity of (the user equipment in) the visited telecommunications network, and either the serving gateway or to the packet data gateway of the home core network and
  another part of the IP transportation tunnel, e.g. a GTP-U part, is established between the serving base station entity of the user equipment, and either the serving gateway or to the packet data gateway of the home core network.

According to a further embodiment of the present invention, it is also possible and preferred that the emergency service information comprises, especially for each of possibly a plurality of different emergency call telephone numbers being valid in the visited telecommunications network:
  a uniform resource name, especially related to an emergency type and/or
  an information related to the emergency type and/or
  the emergency call telephone number, and, wherein especially the emergency service information also comprises an information identifying the visited telecommunications network.

According to the present invention, it is thereby advantageously possible—according to one variant of the present invention—that the emergency service information comprises an information identifying the visited telecommunications network—e.g. a combination of the MCC (Mobile Country Code) and the MNC (Mobile Network Code) or an information encoding a combination of these data—as well as the complete list of emergency call telephone numbers, such that, for each of that list of emergency call telephone numbers, the emergency service information comprises a uniform resource name, especially related to an emergency type, and/or an information related to the emergency type and/or the emergency call telephone number.

Alternatively, according to further variants of the present invention, the emergency service information does not comprise an information identifying the visited telecommunications network, but only the complete list of emergency call telephone numbers, such that, for each of that list of emergency call telephone numbers, the emergency service information comprises a uniform resource name, especially related to an emergency type, and/or an information related to the emergency type and/or the emergency call telephone number.

According to the present invention it is furthermore preferred that the second message comprises an emergency call information, wherein the emergency call information comprises
  a uniform resource name, especially related to an emergency type and/or
  an information related to the emergency type and/or
  the specific emergency call telephone number.

According to the present invention, it is thereby advantageously possible according to variants of the present invention, the emergency call information comprises, e.g., a uniform resource name (such as a uniform resource name that is not at all related to a specific emergency type or such as a uniform resource name that is related to a specific emergency type). According to further (alternative or cumulative) variants of the present invention, the emergency call information comprises an information related to the emergency type. Furthermore, (likewise alternatively or cumulatively to the other possible parts of the emergency call information) the emergency call information comprises the specific emergency call telephone number (i.e. the one used by the user equipment when initiating the voice call (or emergency call)). Furthermore (likewise alternatively or cumulatively to the other possible parts of the emergency call information), the emergency call information comprises a further specific emergency call telephone number (i.e. a different emergency call telephone number when compared to the specific emergency call telephone number).

According to a further preferred embodiment of the present invention, the home telecommunications network comprises a home access network and a home core network, and the visited telecommunications network comprises a visited access network and a visited core network, wherein—within the home core network of the home telecommunications network—the emergency service information is transmitted to a further network node of the home core network, especially a network node of the IP Multimedia Subsystem (or IP Multimedia System) (IMS), wherein the further network node of the home core network especially corresponds to the network node realizing the proxy call session control function for the voice call.

Thereby, it is advantageously possible according to the present invention that the local network node of the IMS (i.e. the local node of the IMS of the home telecommunications network) is able to detect the call type and apply the needed procedures to guarantee successful handling of the call, i.e. in case of a non-UE detected emergency call in the context of the visited telecommunications network, successful handling of the requested emergency service, i.e. apply the already standardized procedures to trigger the user equipment to establish a successful emergency call in the visited telecommunications network. Preferably, the second network node of the home telecommunications network (i.e. the network node of the home telecommunications network that is terminating the IP transportation tunnel upon which the emergency service information is transported, typically either a GTP-C part of that tunnel or a GTP-U part) extracts the emergency service information and transfers this information to the related nodes of the IMS network (i.e. to the further network node of the home telecommunications network).

According to all embodiments of the present invention, the emergency service information is stored, in the home telecommunications network, in a database, wherein especially the database is accessible to all network nodes of the IP Multimedia Subsystem (IMS) of the home telecommunications network.

It is thereby advantageously possible according to the present invention that such a database comprises all the potentially relevant sets of emergency service information, provided via the respective IP transportation tunnels in relation to all user equipments that are currently in a roaming situation with visited telecommunications networks (from the point of view of the home telecommunications network). Due to the fact that the database entry regarding a specific visited telecommunications network is—at least potentially—updated any time a user equipment initiates being in a roaming situation with respect to this specific visited telecommunications network, such a database is automatically and inherently always kept up to date.

According to the present invention it is furthermore preferred that the IP transportation tunnel comprises a user plane (or user part) and a control plane (or control part), wherein the first and second message are transported using the user plane (or user part) of the IP transportation tunnel, and wherein the emergency service information is transported using the control plane (or control part) of the IP transportation tunnel.

Thereby, it is advantageously possible to use the mechanisms of the GTP as IP transportation tunnel, especially the GTP-C as the control plane or control part of the IP transportation tunnel, and the GTP-U as the user plane or user part of the IP transportation tunnel.

Furthermore, the present invention relates to a system for improved handling of emergency calls in a roaming scenario, wherein a user equipment is assigned to a home telecommunications network, and wherein the user equipment is connected to a visited telecommunications network, wherein the system comprises the home telecommunications network and the visited telecommunications network, wherein a first network node of the visited telecommunications network communicates with a second network node of the home telecommunications network via an IP transportation tunnel,
wherein upon an establishment step of the IP transportation tunnel and/or upon a modification step of the IP transportation tunnel an emergency service information is transmitted to the second network node of the home telecommunications network, wherein in case that both
    a voice call is initiated by the user equipment using a specific emergency call telephone number being a valid emergency call telephone number in the visited telecommunications network, and
    the user equipment initially handling the voice call—involving the specific emergency call telephone number—as a normal voice call (non-UE detected emergency call), the system is configured such that:
    the voice call is initiated by the user equipment via transmitting a first message to the (second network node of the) home telecommunications network, the first message comprising the specific emergency call telephone number,
    the specific emergency call telephone number is detected—based on the emergency service information transmitted to the second network node of the home telecommunications network—by the home telecommunications network, as being a valid emergency call telephone number within the visited telecommunications network in relation to the voice call,
    a second message is generated by the home telecommunications network, the second message being transmitted to the user equipment, the second message comprising an indication, to the user equipment, to trigger an emergency call procedure in accordance to the configuration of the visited telecommunications network via a third message.

Furthermore, the present invention relates to a system for improved handling of emergency calls in a roaming scenario, wherein a user equipment is assigned to a home telecommunications network, and wherein the user equipment is connected to a visited telecommunications network, wherein the system comprises the home telecommunications network, the visited telecommunications network and the user equipment, wherein a first network node of the visited telecommunications network communicates with a second network node of the home telecommunications network via an IP transportation tunnel, wherein upon an establishment step of the IP transportation tunnel and/or upon a modification step of the IP transportation tunnel an emergency service information is transmitted to the second network node of the home telecommunications network, wherein in case that both
    a voice call is initiated by the user equipment using a specific emergency call telephone number being a valid emergency call telephone number in the visited telecommunications network, and
    the user equipment initially handling the voice call—involving the specific emergency call telephone number—as a normal voice call (non-UE detected emergency call), the system is configured such that:
    the user equipment is adapted to initiate the voice call via transmitting a first message to the second network node of the home telecommunications network, the first message comprising the specific emergency call telephone number,
    the home telecommunications network is adapted to detect—based on the emergency service information transmitted to the second network node of the home telecommunications network—the specific emergency call telephone number as being a valid emergency call telephone number within the visited telecommunications network in relation to the voice call,
    the home telecommunications network is adapted to generate a second message, and to transmit the second message to the user equipment, the second message comprising an indication, to the user equipment, to trigger an emergency call procedure in accordance to the configuration of the visited telecommunications network via a third message.

Thereby, it is advantageously possible to provide a system that is capable of automatically handling local emergency calls in roaming scenarios (without local breakout and without the need to rely on user equipment implementation when providing numbers to the user equipment) in a correct manner, just by initially transmitting the emergency service information to the home telecommunications network. Consequently, it is advantageously possible to drastically reduce the efforts necessary to maintaining an up to date list of local emergency numbers of all roaming partners (i.e. of all potential visited telecommunications networks) in the home telecommunications network.

According to the present invention it is furthermore preferred—especially with respect to an exemplary embodiment of the inventive system—that the system is configured such that the emergency service information comprises, especially for each of possibly a plurality of different emergency call telephone numbers being valid in the visited telecommunications network:
    a uniform resource name, especially related to an emergency type and/or
    an information related to the emergency type and/or
    the emergency call telephone number,
and, wherein especially the emergency service information also comprises an information identifying the visited telecommunications network.

Furthermore, the present invention relates to a telecommunications network for improved handling of emergency calls in a roaming scenario, wherein a user equipment is assigned to a home telecommunications network, and wherein the user equipment is connected to the telecommunications network as a visited telecommunications network, wherein a first network node of the telecommunications network communicates with a second network node of the home telecommunications network via an IP transportation tunnel, wherein upon an establishment step of the IP transportation tunnel and/or upon a modification step of the IP transportation tunnel an emergency service information is transmitted to the second network node of the home telecommunications network, wherein in case that both a voice call is initiated by the user equipment using a specific emergency call telephone number being a valid emergency call telephone number in the telecommunications network, and the user equipment initially handling the voice call—involving the specific emergency call telephone number—as a normal voice call (non-UE detected emergency call), the telecommunications network is configured such that:

the voice call is initiated by the user equipment via transmitting a first message to the (second network node of the) home telecommunications network, the first message comprising the specific emergency call telephone number, the specific emergency call telephone number is detected—based on the emergency service information transmitted to the second network node of the home telecommunications network—by the home telecommunications network, as being a valid emergency call telephone number within the telecommunications network in relation to the voice call, a second message is generated by the home telecommunications network, the second message being transmitted to the user equipment, the second message comprising an indication, to the user equipment, to trigger an emergency call procedure in accordance to the configuration of the telecommunications network via a third message.

Furthermore, the present invention relates to a telecommunications network for improved handling of emergency calls in a roaming scenario, wherein a user equipment is assigned to a home telecommunications network, and wherein the user equipment is connected to the telecommunications network as a visited telecommunications network, wherein a first network node of the telecommunications network communicates with a second network node of the home telecommunications network via an IP transportation tunnel, wherein upon an establishment step of the IP transportation tunnel and/or upon a modification step of the IP transportation tunnel an emergency service information is transmitted to the second network node of the home telecommunications network, wherein in case that both a voice call is initiated by the user equipment using a specific emergency call telephone number being a valid emergency call telephone number in the telecommunications network, and the user equipment initially handling the voice call—involving the specific emergency call telephone number—as a normal voice call (non-UE detected emergency call), the telecommunications network is configured such that:

the user equipment is adapted to initiate the voice call via transmitting a first message to the second network node of the home telecommunications network, the first message comprising the specific emergency call telephone number, the home telecommunications network is adapted to detect—based on the emergency service information transmitted to the second network node of the home telecommunications network—the specific emergency call telephone number as being a valid emergency call telephone number within the telecommunications network in relation to the voice call, the home telecommunications network is adapted to generate a second message, and to transmit the second message to the user equipment, the second message comprising an indication, to the user equipment, to trigger an emergency call procedure in accordance to the configuration of the telecommunications network via a third message.

Thereby, it is advantageously possible to provide the telecommunications network as a visited telecommunications network such that local emergency calls in roaming scenarios that do not use local breakout can be handled easily and without the need to rely on user equipment implementation when providing numbers to the user equipment.

Furthermore, the present invention relates to telecommunications network or network node within an exemplary embodiment of an inventive system, wherein the telecommunications network and/or the network node is either part of the home telecommunications network of the system or of the visited telecommunications network of the system.

Thereby, it is advantageously possible to provide a telecommunications network and/or a network node such that local emergency calls in roaming scenarios that do not use local breakout can be handled easily and without the need to rely on user equipment implementation when providing numbers to the user equipment.

Additionally, the present invention relates to a program comprising a computer readable program code which, when executed on a computer or on a network node of a home telecommunications network or on a network node of a visited telecommunications network, or in part on the network node of the home telecommunications network and in part on the network node of the visited telecommunications network, causes the computer or the network node of the home telecommunications network or the network node of the visited telecommunications network to perform an exemplary embodiment of the inventive method.

Still additionally, the present invention relates to a computer program product for a home telecommunications network and/or a visited telecommunications network, the computer program product comprising a computer program stored on a storage medium, the computer program comprising program code which, when executed on a computer or on a network node of a home telecommunications network or on a network node of a visited telecommunications network, or in part on the network node of the home telecommunications network and in part on the network node of the visited telecommunications network, causes the computer or the network node of the home telecommunications network or the network node of the visited telecommunications network to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a first telecommunications network 100, e.g. a mobile communication network such as a public land mobile network, and a second telecommunications network 200, likewise e.g. a mobile communication network such as a public land mobile network, are schematically shown. The first telecommunications network 100 is associated to (or assigned to) a user equipment 20 (or the user equipment 20 is assigned to the first telecommunications network 100), resulting in the first telecommunications network 100 being the home telecommunications network of the user equipment 20. The present invention relates to the situation of the user equipment 20 being in a roaming situation, i.e. the user equipment 20 being connected not to the home telecommunications network but to the second telecommunications network 200, which is referred to by the term visited telecommunications network.

The home telecommunications network comprises a first access network 110 (also called home access network) or access part and a first core network 120 (also called home core network). The home telecommunications network is, e.g., a cellular telecommunications network comprising typically a plurality of network cells (not depicted in FIG. 1). The first (or home) access network 110 comprises at least one first access entity 111 such as (especially in case of mobile communication networks) a base station entity enabled to serve a user equipment 20. In case of the home telecommunications network being a mobile communication network, the first access entity 111 typically serves a radio cell, i.e. a radio coverage area of the access entity (or base station entity) or associated to the first access entity 111, and the user equipment 20 is able to be connected to the first access entity 111 via a radio link or a wireless communication link. In case of the home telecommunications network being a fixed communication network, the first access entity 111 is typically a network access point to which the user equipment 20 is able to be connected by a wireline connection, or the first access entity 111 is connected to a local wireless access point, providing the possibility for the user equipment 20 to be connected to the first access entity 111 via a wireless communication link. The visited telecommunications network comprises a second access network 210 (also called visited access network) or access part and a second core network 220 (also called visited core network). The visited telecommunications network is, e.g., a cellular telecommunications network comprising typically a plurality of network cells (not depicted in FIG. 1). The second access network 210 comprises at least one second access entity 211 such as (especially in case of mobile communication networks) a base station entity enabled to serve the user equipment 20. In case of the visited telecommunications network being a mobile communication network, the second access entity 211 typically serves a radio cell, i.e. a radio coverage area of the second access entity 211 (or base station entity) or associated to the second access entity 211, and the user equipment 20 is able to be connected to the second access entity 211 via a radio link or wireless communication link. In case of the visited telecommunications network being a fixed communication network, the second access entity 211 is typically a network access point to which the user equipment 20 is able to be connected by a wireline connection, or the second access entity 211 is connected to a local wireless access point, providing the possibility for the user equipment 20 to be connected to the first access entity 111 via a wireless communication link.

In the exemplary representation of a roaming situation depicted in FIG. 1, the user equipment 20 is connected— while being assigned (or associated) to the home telecommunications network—to the second access entity 211 of the visited telecommunications network. Furthermore, a further access entity 212 is schematically shown in FIG. 1 as being part of the visited telecommunications network.

In such a roaming situation of the user equipment 20, in case that a type of call handling involving local breakout is used (i.e. the proxy functionality of the visited telecommunications network (and not of the home telecommunications network) is used), a network node of the visited telecommunications network is primarily used for call handling, such as a proxy call session control function of the visited telecommunications network. In such a situation, such a network node of the visited telecommunications network should know any valid emergency call telephone numbers that can be used within the visited telecommunications network.

However, in case that a type of call handling avoiding local breakout is used (typically this means that the proxy functionality of the home telecommunications network is used), either the user equipment 20 would normally need to be provisioned with the valid emergency call telephone numbers that can be used within the visited telecommunications network, or a network node of the home telecommunications network would need to have (or at least be able to easily access) this information, i.e. the valid emergency call telephone numbers that can be used within this visited telecommunications network, but—as the user equipment 20 is typically able to roam un a multitude of potential visited telecommunications networks—also the valid emergency call telephone numbers of any other possible visited telecommunications network of any roaming partner of the home telecommunications network. The maintenance efforts of such a database are typically quite important, especially for network operators having a comparatively important number of roaming partners, especially in case that the such an information is not provided automatically to the home telecommunications network.

The present invention solves this problem by automatically providing or completing the information, towards the home telecommunications network, about the valid emergency call telephone numbers that can be used within the visited telecommunications network. According to the present invention, a mechanism is provided that delivers local emergency service information (i.e. the information about the valid emergency call telephone numbers in the visited telecommunications network) to the IMS of the home telecommunications network (when the user equipment is roaming in scenarios without local breakout). According to the present invention, it is taken advantage that during bearer setup procedures for IMS signaling, an IP tunnel (or IP transportation tunnel) is established (or modified) from the visited telecommunications network towards the home telecommunications network: Using this IP transportation tunnel, an emergency service information is transmitted to the home telecommunications network via, preferably, a network node of the enhanced packet system in the visited telecommunications network putting the emergency service information of this network into the signaling procedures of the IP (transportation) tunnel.

In FIG. 1, an IP (transportation) tunnel 25 is schematically shown. The IP (transportation) tunnel 25 is shown as being established between the second access entity 211 at one end of the IP transportation tunnel 25, and a second network node 121 of the home telecommunications network. In the context of the present invention, the second access entity 211 is also called the first network node of the visited telecommunications network, and the IP transportation tunnel 25 is established (at least) between the first network node (or second access entity) of the visited telecommunications network and the second network node 121 of the home telecommunications network.

According to the present invention, the IP transportation tunnel 25 is especially realized via a GTP tunnel, the term "GTP tunnel" referring to a tunnel using the GPRS Tunneling protocol (GTP). The GTP is an IP/UDP-based protocol used in GSM, UMTS, and LTE core networks. The GTP is typically implemented using a GTP-C part as well as a GTP-U part, the GTP-C part being the control part, used for specific signaling (e.g. bearer activation/deletion/modification, etc.), and the GTP-U part being used in user plane to carry user data traffic. According to the present invention, the IP transportation tunnel 25 (or a part thereof, such as the GTP-C part) can also be established—besides between the first network node of the visited telecommunications network and a second network node 121 of the home telecommunications network (where, e.g., the GTP-U part is established)—between an additional network node 213 (such as the responsible mobility management entity) of the visited telecommunications network and the second network node 121 of the home telecommunications network. This second branch or part of the IP transportation tunnel 25 is schematically represented via a dashed line in FIG. 1.

Upon the user equipment 20 initiating a voice call using an emergency call telephone number (among the (possibly numerous) valid emergency call telephone numbers accessible in the visited telecommunications network), hereinafter also called specific emergency call telephone number, the user equipment 20 is not necessarily aware of the fact that this voice call relates to a valid emergency call telephone number within the visited telecommunications network (non-UE detected emergency call). As a consequence, the user equipment 20 handles the voice call as a normal voice call.

According to the present invention, via initially transmitting the emergency service information to the home telecommunications network (using the IP transportation tunnel 25) the information about the specific emergency call telephone number being a valid emergency call telephone number (within the visited telecommunications network) is already known to the home telecommunications network prior to the user equipment 20 initiating the voice call. Thus, despite the fact that the proxy functionality of the home telecommunications network is used for processing the voice call—on the basis of the emergency service information—the home telecommunications network is able to request the user equipment 20 to trigger an emergency call procedure towards the visited telecommunications network. Hence, according to the present invention, local breakout is not used and local emergency numbers are not provided to the user equipment 20. As the home telecommunications network is able to detect that the initiated voice call is emergency related, a network node in the home telecommunications network is able to detect a call setup as an emergency call by analyzing the requested number (of the voice call). This node in the home telecommunications network typically assigns a corresponding sos-URN (uniform resource name of the sos top level domain).

Figure 2:
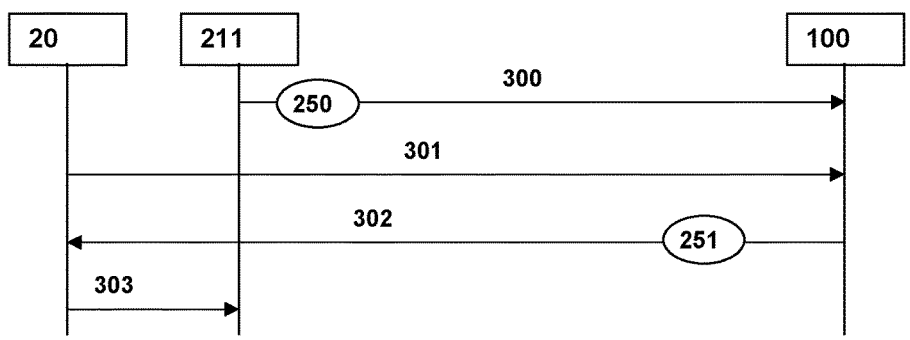
FIG. 2 schematically illustrates a communication diagram between the user equipment, the home telecommunications network and the visited telecommunications network, wherein the exchange of different messages is shown in view of initiating an emergency call.

An exemplary embodiment of this inventive method is represented schematically in greater detail in FIG. 2.

In a preliminary step the emergency service information 250 (of the visited telecommunications network) is transmitted to the second network node 121 of the home telecommunications network, using the IP transportation tunnel 25. According to the present invention, the transmission of the emergency service information 250 is related to the (existence or applicability of the) roaming situation of the user equipment 20 in such a manner that upon invocation of the roaming situation, the emergency service information 250 is transmitted using the IP transportation tunnel 25. In a first situation, the user equipment 20 is switched on (or a (first or initial) data connection of the user equipment 20 is established) while being located in the coverage area of the visited telecommunications network; according to a second situation, the user equipment 20 enters the coverage area of the visited telecommunications network while being connected to the home telecommunications network (or to another visited telecommunications network which is not depicted in the figures). Both the visited telecommunications network and the home telecommunications network are configured such that the emergency service information 250 is initially transmitted to the home telecommunications network in both of the mentioned situations (i.e. the IP transportation tunnel 25 is either generated or modified and the emergency service information 250 transmitted). After the emergency service information 250 being transmitted to the home telecommunications network, the home telecommunications network is aware of the emergency call telephone numbers currently applicable in the visited telecommunications network 200, and hence, in case that (at a point in time subsequent to the transmission of the emergency service information 250) a voice call is initiated by the user equipment 20 using the specific emergency call telephone number and the user equipment 20 is not aware of the used telephone number being a valid emergency call telephone number, the home telecommunications network is able to indicate to the user equipment 20 how to behave in order to correctly treat the voice call.

According to the present invention, in a first step, the user equipment 20 initiates the voice call via transmitting a first message 310 to the home telecommunications network (thereby typically also using the IP transportation tunnel 25, i.e. transferring the first message 310 between the first network node of the visited telecommunications network to the second network node 121 of the home telecommunications network). In a second step, the home telecommunications network—based on the emergency service information 250—detects the specific emergency call telephone number (used by the user equipment 20) as being a valid emergency call telephone number within the visited telecommunications network, and, in a third step, transmits a second message 302 from the home telecommunications network to the user equipment 20, thereby indicating to the user equipment how to behave (i.e. via the second message 302, the user equipment 20 becomes aware of having initiated an emergency call by originally initiating the voice call and triggering the first message 301), i.e. comprising an indication to the user equipment to trigger an emergency call procedure in accordance to the configuration of the visited telecommunications network via a third message 303 (to be sent typically from the user equipment 20 to the visited telecommunications network). According to the present invention, the first message 301 comprises the specific emergency call telephone number. The second message 302 comprises an emergency call information 251, wherein the emergency call information 251 especially comprises a uniform resource name, especially related to an emergency type, and/or an information related to the emergency type and/or the specific emergency call telephone number.

According to the present invention, it is preferred that the enhanced packet system in the visited telecommunications network can put a list of all local emergency information (numbers+mapping to sos-URNs), i.e. the emergency service information 250, into the transmission of signaling information during IP tunnel (GTP) establishment towards the home telecommunications network. It is advantageously possible that this network node of the enhanced packet system in the visited telecommunications network adds an identifier of the visited telecommunications network to the list of local emergency service information 250 into the signaling via the IP tunnel 25 towards the home telecommunications network. A network node of the enhanced packet system in home telecommunications network (typically the second network node 121 of the home telecommunications network) extracts the emergency service list (or emergency service information 250) and provides it to the related P-CSCF node in IMS home network. The respective (first) network node 121 in the home telecommunications network can additionally add information identifying the visited telecommunications network. According to the present invention, this information (i.e. the information identifying the visited telecommunications network) was either included in the emergency service list (emergency service information 250) send from the visited telecommunications network or is deduced from other parameters at the home telecommunications network (e.g. from parameters such as the IP-address, the (IP) Port etc. . . . ). The home telecommunications network can advantageously also store received emergency service information 250 in a database which is accessible for related IMS nodes (e.g. P-CSCF).

According to the present invention, the emergency service information 250 comprises (or consists of) a list of all local (i.e. in the visited telecommunications network) emergency numbers and the related mapping to corresponding sos-URNs. Additionally this list of emergency service information 250 can be extended with an element identifying the visited telecommunications network. The IP tunnel including this information (emergency service information) is routed via various interconnections to the home telecommunications network of the user equipment 20. In the home telecommunications network at the network node (e.g. PDN) terminating the GTP (signaling) tunnel, this emergency service list is extracted and transferred to the related nodes of the IMS network. Optionally, an information of the identity of visited telecommunications network can be deduced at home telecommunications network and stored within the emergency service list (emergency service information 250). Additionally this emergency service information 250 can be stored and updated in a database which is accessible for all related IMS nodes. At the IMS network, the assigned P-CSCF can now use this information to identify non-UE-detected emergency calls of the user equipment 20 in the visited telecommunications network and apply the already standardized procedures to trigger the user equipment 20 to establish a successful emergency call in the visited telecommunications network.

The transport of the emergency service information 250 can be done dynamically at bearer establishment by reusing well defined IP tunnel transport towards the home telecommunications network without an impact on potentially encrypted SIP signaling. According to the present invention, this enables a flexible method—especially on a basis per user equipment 20—to provide the actual emergency number together with the mapping to a sos-URN for the P-CSCF in the home telecommunications network. As the transmission of the emergency service information 250 is done automatically and for each user equipment 20 upon establishment of the respective IP tunnel 25, there is no need for the home network operator to put efforts in maintaining a huge list of local emergency numbers of all roaming partners and furthermore, no additional separate interconnection signalling is needed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling emergency calls in a roaming scenario, wherein the method comprises:
    transmitting, by a user equipment connected to a visited telecommunications network, to a network node of a home telecommunications network to which the user equipment is assigned, a first message comprising a telephone number so as to initiate a voice call, wherein the telephone number is a valid emergency call telephone number of the visited telecommunications network but the user equipment does not recognize the telephone number of the first message as an emergency call telephone number;

initially handling, by the user equipment, the voice call as a normal non-emergency voice call;

receiving, by the user equipment, from the home telecommunications network, a second message comprising an indication to the user equipment to trigger an emergency call procedure in accordance with the configuration of the visited telecommunications network via a third message, wherein the second message is generated by the home telecommunications network in response to the home telecommunications network detecting that the telephone number of the first message is a valid emergency call telephone number of the visited telecommunications network based on emergency service information received by the network node of the home telecommunications network from a network node of the visited telecommunications network via an IP transportation tunnel; and in response to the second message received from the home telecommunications network, triggering, by the user equipment, via the third message, the emergency call procedure in accordance with the configuration of the visited telecommunications network.

2. The method according to claim 1, wherein a proxy functionality of the home telecommunications network is used in the roaming scenario.

3. The method according to claim 1, wherein the home telecommunications network comprises a home access network and a home core network, and the visited telecommunications network comprises a visited access network and a visited core network, wherein the visited access network of the visited telecommunications network comprises a plurality of base station entities, wherein the user equipment is connected to the visited telecommunications network via one of the base station entities being the serving access entity of the user equipment, wherein the network node of the visited telecommunications network corresponds to the serving access entity of the user equipment and/or to a mobility management entity of the visited telecommunications network, and the network node of the home telecommunications network corresponds to a serving gateway or to a packet data gateway of the home core network.

4. The method according to claim 1, wherein the emergency service information comprises, for each of a plurality of valid emergency call telephone numbers of the visited telecommunications network: a uniform resource name related to an emergency type; and/or information related to the emergency type; and/or the emergency call telephone number; and wherein the emergency service information further comprises information identifying the visited telecommunications network.

5. The method according to claim 1, wherein the second message comprises emergency call information, wherein the emergency call information comprises: a uniform resource name related to an emergency type; and/or information related to the emergency type; and/or the specific emergency call telephone number.

6. The method according to claim 1, wherein the home telecommunications network comprises a home access network and a home core network, and the visited telecommunications network comprises a visited access network and a visited core network, wherein—within the home core network of the home telecommunications network—the emergency service information is transmitted to a further network node of the home core network, wherein the further network node is a network node of an IP Multimedia Subsystem (IMS), and wherein the further network node of the home core network corresponds to the network node realizing a proxy call session control function for the voice call.

7. The method according to claim 1, wherein the emergency service information is stored, in the home telecommunications network, in a database, wherein the database is accessible to all network nodes of an IP Multimedia Subsystem (IMS) of the home telecommunications network.

8. The method according to claim 1, wherein the IP transportation tunnel between the network node of the home telecommunications network and the network node of a visited telecommunications network comprises a user plane and a control plane, wherein the first and second messages are transported using the user plane of the IP transportation tunnel, and wherein the emergency service information is transported to the home telecommunications network using the control plane of the IP transportation tunnel.

9. A system for handling emergency calls in a roaming scenario, wherein the system comprises:

a home telecommunications network;
a visited telecommunications network; and
a user equipment assigned to the home telecommunications network;
wherein the user equipment is connected to the visited telecommunications network;
wherein a network node of the visited telecommunications network is configured to receive emergency service information from a network node of the home telecommunications network via an IP transportation tunnel;
wherein the user equipment is configured to transmit to the network node of the home telecommunications network a first message comprising a telephone number so as to initiate a voice call, wherein the telephone number is a valid emergency call telephone number of the visited telecommunications network but the user equipment does not recognize the telephone number of the first message as an emergency call telephone number;
wherein the user equipment is configured to initially handle the voice call as a normal non-emergency voice call;
wherein the home telecommunications network is configured to detect—based on the emergency service information transmitted to the network node of the home telecommunications network—the telephone number of the first message as being a valid emergency call telephone number of the visited telecommunications network;
wherein the home telecommunications network is configured to generate a second message based on detecting the telephone number of the first message as being a valid emergency call telephone number of the visited telecommunications network, and to transmit the second message to the user equipment, the second message comprising an indication, to the user equipment, to trigger an emergency call procedure in accordance with the configuration of the visited telecommunications network via a third message; and
wherein the user equipment is configured to, in response to receiving the second message received from the home telecommunications network, trigger, via the third message, the emergency call procedure in accordance with the configuration of the visited telecommunications network.

10. The system according to claim 9, wherein the emergency service information comprises, for each of a plurality of valid emergency call telephone numbers of the visited telecommunications network: a uniform resource name related to an emergency type; and/or an information related to the emergency type; and/or the emergency call telephone number; and wherein the emergency service information further comprises information identifying the visited telecommunications network.

11. A non-transitory computer-readable medium having processor-executable instructions stored thereon for handling emergency calls in a roaming scenario, wherein the processor-executable instructions, when executed, facilitate:

transmitting, by a user equipment connected to a visited telecommunications network, to a network node of a home telecommunications network to which the user equipment is assigned, a first message comprising a telephone number so as to initiate a voice call, wherein the telephone number is a valid emergency call telephone number of the visited telecommunications network but the user equipment does not recognize the telephone number of the first message as an emergency call telephone number;

initially handling, by the user equipment, the voice call as a normal non-emergency voice call;

receiving, by the user equipment, from the home telecommunications network, a second message comprising an indication to the user equipment to trigger an emergency call procedure in accordance with the configuration of the visited telecommunications network via a third message, wherein the second message is generated by the home telecommunications network in response to the home telecommunications network detecting that the telephone number of the first message is a valid emergency call telephone number of the visited telecommunications network based on emergency service information received by the network node of the home telecommunications network from a network node of the visited telecommunications network via an IP transportation tunnel; and in response to the second message received from the home telecommunications network, triggering, by the user equipment, via the third message, the emergency call procedure in accordance with the configuration of the visited telecommunications network.

\* \* \* \* \*